United States Patent
Chng et al.

(10) Patent No.: US 11,449,124 B2
(45) Date of Patent: *Sep. 20, 2022

(54) INTELLIGENT DEVICE WAKEUP

(71) Applicant: Google LLC, Mountain View, CA (US)

(72) Inventors: Choon Ping Chng, Los Altos, CA (US); Rachel Nancollas, San Francisco, CA (US); Alec Berg, San Mateo, CA (US); Alexandra Levich, San Francisco, CA (US)

(73) Assignee: Google LLC, Mountain View, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/913,430

(22) Filed: Mar. 6, 2018

(65) Prior Publication Data

US 2018/0196499 A1    Jul. 12, 2018

Related U.S. Application Data

(63) Continuation of application No. 15/894,658, filed on Feb. 12, 2018, which is a continuation of application
(Continued)

(51) Int. Cl.
*G06F 1/32* (2019.01)
*G06F 1/3287* (2019.01)
(Continued)

(52) U.S. Cl.
CPC .............. *G06F 1/3287* (2013.01); *G06F 1/14* (2013.01); *G06F 1/28* (2013.01); *G06F 1/3228* (2013.01);
(Continued)

(58) Field of Classification Search
None
See application file for complete search history.

(56) References Cited

U.S. PATENT DOCUMENTS 7,685,606 B2    3/2010    Chang et al.
8,627,125 B2 *  1/2014    Kashyap ............... G06F 1/3206
                                                  345/212
(Continued)

FOREIGN PATENT DOCUMENTS

CN        1782956 A     6/2006
CN      101778456 A     7/2010
(Continued)

OTHER PUBLICATIONS

Jih, et al., "A Multi-agent Context-aware Service Platform in a Smart Space", Journal of Computers, vol. 18, No. 1, Apr. 2007, 16 pages.

(Continued)

*Primary Examiner* — Fahmida Rahman
(74) *Attorney, Agent, or Firm* — Brake Hughes Bellermann LLP

(57) ABSTRACT

In one general aspect, a method can include determining that a computing device is in a stationary position for a predetermined time, placing the computing device in a first power mode, detecting input from at least one sensor included in the computing device, identifying at least one application to launch on the computing device based on the detected input and on a heuristic-based usage pattern for the computing device, and transitioning the computing device from the first power mode to a second power mode based on the detected input. The transitioning can include automatically launching the at least one application on the computing device. The at least one application can provide content for display on a display device included in the computing device.

20 Claims, 5 Drawing Sheets

Related U.S. Application Data

No. 14/871,192, filed on Sep. 30, 2015, now Pat. No. 9,891,696.

(60) Provisional application No. 62/059,309, filed on Oct. 3, 2014.

(51) Int. Cl.
| | |
|---|---|
| *G06F 1/28* | (2006.01) |
| *G06F 3/01* | (2006.01) |
| *G06F 1/14* | (2006.01) |
| *G06F 1/3228* | (2019.01) |
| *G06F 1/3231* | (2019.01) |

(52) U.S. Cl.
CPC ............ *G06F 1/3231* (2013.01); *G06F 3/017* (2013.01); *Y02D 10/00* (2018.01)

(56) References Cited

U.S. PATENT DOCUMENTS

| | | | |
|---|---|---|---|
| 8,635,560 B2 | 1/2014 | Drader et al. | |
| 8,862,715 B1 | 10/2014 | Tom et al. | |
| 9,338,744 B2* | 5/2016 | Syed ................ | H04W 52/0225 |
| 9,781,106 B1 | 10/2017 | Vitus et al. | |
| 10,671,634 B2* | 6/2020 | Chan ...................... | H04L 67/06 |
| 2009/0303204 A1* | 12/2009 | Nasiri ................... | G06F 3/0346 |
| | | | 345/184 |
| 2010/0182270 A1 | 7/2010 | Caliskan et al. | |
| 2010/0235667 A1* | 9/2010 | Mucignat .............. | G06F 1/3203 |
| | | | 713/323 |
| 2010/0317371 A1 | 12/2010 | Westerinen et al. | |
| 2011/0316797 A1 | 12/2011 | Johansson | |
| 2012/0154303 A1 | 6/2012 | Lazaridis et al. | |
| 2013/0124848 A1 | 5/2013 | Fried et al. | |
| 2014/0020445 A1 | 1/2014 | Waters et al. | |
| 2014/0024392 A1 | 1/2014 | Su et al. | |
| 2014/0047259 A1* | 2/2014 | Price ...................... | G06F 1/3206 |
| | | | 713/324 |
| 2014/0075178 A1 | 3/2014 | Trethewey | |
| 2014/0075230 A1 | 3/2014 | Suggs et al. | |
| 2014/0344289 A1* | 11/2014 | Berenson ........... | H04N 21/4586 |
| | | | 707/751 |
| 2015/0015477 A1 | 1/2015 | Hughes et al. | |
| 2015/0205335 A1* | 7/2015 | Teshome ............... | G06F 1/3206 |
| | | | 713/300 |
| 2015/0215566 A1 | 7/2015 | McRae | |
| 2015/0356030 A1 | 12/2015 | Zahand et al. | |
| 2016/0098076 A1 | 4/2016 | Chng et al. | |

FOREIGN PATENT DOCUMENTS

| | | |
|---|---|---|
| CN | 101859173 A | 10/2010 |
| CN | 102789305 A | 11/2012 |
| CN | 104076903 A | 10/2014 |
| CN | 104246650 A | 12/2014 |
| WO | 2016054377 A1 | 4/2016 |

OTHER PUBLICATIONS

International Search Report and Written Opinion for PCT Application No. PCT/US2015/053496, dated Jan. 13, 2016, 13 pages.
Zelenik , "An Approach to Context Aware Event Reminding", Information Sciences and Technologies Bulletin of the ACM Slovakia, Special Section on Student Research in Informatics and Information Technologies, vol. 3, No. 2, 2011, pp. 126-130.
Office Action with English translation for Chinese Application No. 201580035418.9, dated Nov. 1, 2018, 25 pages.
U.S. Appl. No. 15/894,658, filed Feb. 12, 2018, Pending.
U.S. Appl. No. 14/871,192, filed Sep. 30, 2015, Issued.

* cited by examiner

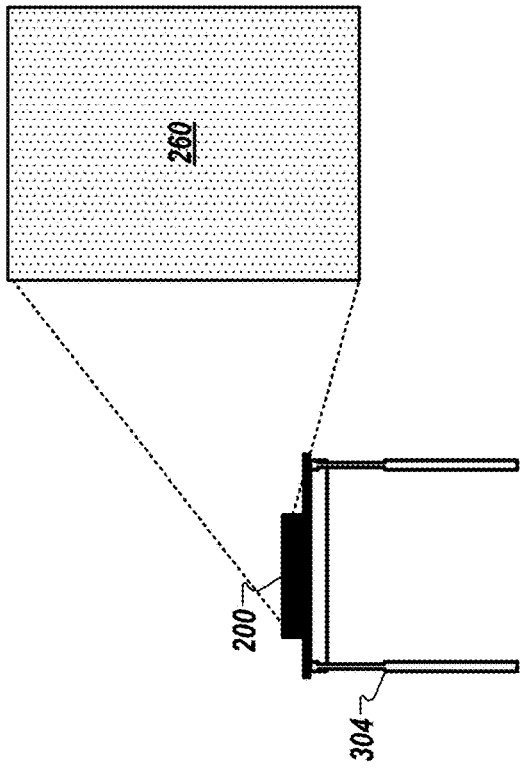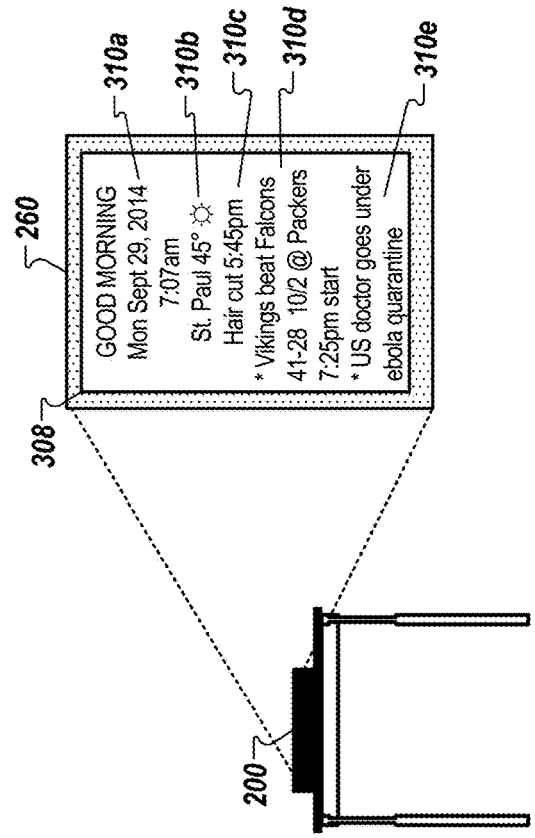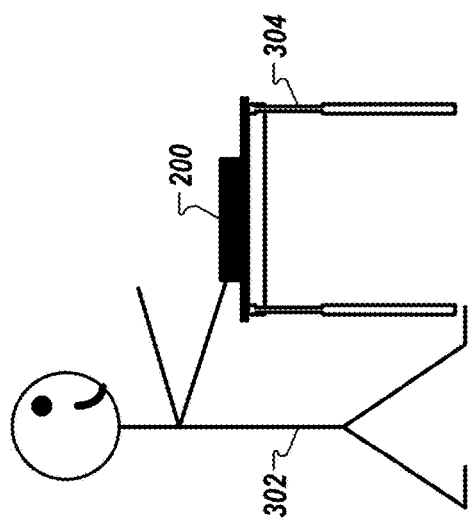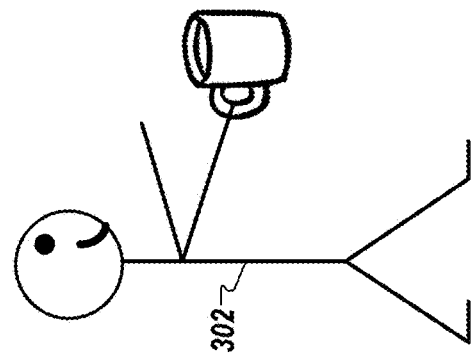
FIG. 3A
FIG. 3B
FIG. 3C

INTELLIGENT DEVICE WAKEUP

CROSS-REFERENCE TO RELATED APPLICATIONS

This application is a continuation of, and claims priority under 35 U.S.C. § 120 to, U.S. application Ser. No. 15/894,658, filed on Feb. 12, 2018, entitled "INTELLIGENT DEVICE WAKEUP," which is a continuation of, and claims priority under 35 U.S.C. § 120 to, U.S. application Ser. No. 14/871,192, filed on Sep. 30, 2015, entitled "INTELLIGENT DEVICE WAKEUP," which claims priority under 35 U.S.C. § 119(e)(1), to U.S. Provisional Application Ser. No. 62/059,309, filed on Oct. 3, 2014, the entire contents of all of which are incorporated herein by reference.

TECHNICAL FIELD

This description generally relates to computing devices. The description, in particular, relates to waking up a computing device from a low power state to an active state.

BACKGROUND

A computing device can include one or more sensors. The sensors can provide data and information related to a context, current state, or condition of the computing device. In addition or in the alternative, the sensors can provide data and information related to user interactions with the computing device. For example, one or more accelerometers can provide data indicative of movement and/or orientation of the computing device. Touch sensors (e.g., a touchscreen, a touchpad, a trackpad) can detect contact of a user or conductive object with a surface of the sensor. In addition or in the alternative, the computing device can include one or more built-in devices that can be used to identify a context for the computing device. For example, a computing device can include a time of day clock.

Keeping the multitude of sensors and other built-in devices operational on the computing device in order to provide data and information indicative of a state and/or context of the computing device can consume measurable power. The amount of power consumed can be significant when the computing device is operating under battery power. Batteries as well as the sensors and built-in devices, however, are becoming increasing more efficient, reliable, and affordable. As such, the sensors and built-in devices are becoming valuable tools that can be used to determine the context of a computing device and the interactions of a user with the computing device in the determined context.

SUMMARY

In one general aspect, a method can include determining that a computing device is in a stationary position for a predetermined time, placing the computing device in a first power mode, detecting input from at least one sensor included in the computing device, identifying at least one application to launch on the computing device based on the detected input and on a heuristic-based usage pattern for the computing device, and transitioning the computing device from the first power mode to a second power mode based on the detected input. The transitioning can include automatically launching the at least one application on the computing device. The at least one application can provide content for display on a display device included in the computing device.

Example implementations may include one or more of the following features. For instance, the first power mode can be one of a sleep mode and a hibernate mode. The second power mode can be an active power state. Determining that a computing device is in a stationary position for a predetermined time can include not receiving input from at least two or more of an accelerometer, an input device, a motion sensor, a proximity sensor, and a touch sensor. Detecting input from at least one sensor can include detecting vibrations occurring in an ambient environment of the computing device. Detecting input from at least one sensor can include detecting, by at least one proximity sensor, a proximity of a user to the computing device. Identifying the at least one application to launch on the computing device can be based on information obtained from an activity monitor and information obtained from at least one other type of device. The information obtained from the activity monitor can include user provided information. The information obtained from the activity monitor can include information for patterns of usage of the computing device. The method can further include providing the detected input to a power manager included in the computing device. The power manager can be configured to obtain information from an activity monitor, obtain information from at least one other type of device included in the computing device, and determine the second power mode based on the detected input, the obtained information from the activity monitor, and the obtain information from the at least one other type of device. Obtaining information from an activity monitor can include obtaining user provided information. Determining the second power mode can be further based on the user provided information. Obtaining information from an activity monitor can include obtaining information for patterns of usage of the computing device. Determining the second power mode can be further based on the patterns of usage of the computing device. Obtaining information from at least one other type of device can include obtaining information from one of a real-time clock, a timer, an audio system, and at least one input device.

In another general aspect, a computing device can include a plurality of sensors configured to provide data indicative of an ambient environment of the computing device, a power manager configured to receive sensor data indicating a proximity of a user to the computing device, identify a power mode for the computing device based on the received sensor data, and based on the received sensor data transition the computing device from a first power mode to a second power mode, and automatically launch at least one application on the computing device. The computing device can further include a display device configured to display content provided by the at least one application.

Example implementations may include one or more of the following features. For instance, the computing device can further include a real-time clock (RTC) configured to provide data indicative of time and date information. The power manager can be further configured to receive the RTC data, and identify a power mode for the computing device based on the received sensor data and the RTC data. The computing device can further include a memory configured to store information regarding an operating state of the computing device. Transitioning the computing device from a first power mode to a second power mode can include restoring an operating state of the computing device using the stored information. The first power mode can be one of a sleep mode and a hibernate mode. The second power mode can be an active power state. The power manager can be configured to identify the at least one application to launch on the computing device based on at least one of the received sensor data, information obtained from an activity monitor, and information obtained from at least one other type of device.

In yet another general aspect, a non-transitory, machine-readable medium having instructions stored thereon, the instructions, when executed by a processor, cause a computing device to determine that a computing device is in a stationary position for a predetermined time, place the computing device in a first power mode, detect input from at least one sensor included in the computing device, identify at least one application to launch on the computing device based on the detected input and on a heuristic-based usage pattern for the computing device, and transition the computing device from the first power mode to a second power mode based on the detected input. The transitioning includes automatically launching the at least one application on the computing device, the at least one application providing content for display on a display device included in the computing device.

The details of one or more implementations are set forth in the accompanying drawings and the description below. Other features will be apparent from the description and drawings, and from the claims.

BRIEF DESCRIPTION OF THE DRAWINGS

FIG. 3A is a diagram that shows an illustration of a user placing a computing device on a table.

FIG. 3B is a diagram that shows an illustration of a display device included in a computing device.

FIG. 3C is a diagram that shows an illustration of a user moving/walking towards a table and content displayed on a display device of a computing device placed on the table.

Like reference symbols in the various drawings indicate like elements.

DETAILED DESCRIPTION

A computing device can use sensor-based context awareness to enhance interactions of a user with the computing device. The computing device can include a plurality of sensors that can provide data and information related to a state, condition, or context of the computing device. The computing device can also include other types of devices (e.g., input devices, a real-time clock, timers) that can also provide data and information about the context or operating state of the computing device. The data and information can be provided to circuitry and software included in the computing device. The circuitry and software can process and/or interpret the data and information and can determine an operating state (operating mode) for the computing device based on past interactions of the user with the computing device when in the identified context, state, or condition. The computing device can then be automatically placed into the operating mode. Sensor-based context awareness can enhance the experience of the user with the computing device by having the computing device predict and immediately satisfy the needs of the user.

For example, based on sensors and other types of devices providing certain data and information, the computing device can determine a particular context and/or state of the computing device. Based on a record of prior interactions of a user with the computing device when the computing device is in the particular context and/or state, the computing device can automatically wake up from a low power state and enter a predetermined operating mode. The predetermined operating mode can be an operating mode that the user may have selectively entered when the computing device was in the particular context and/or state when waking up from the low power state. Sensor-based context awareness can enhance wakeup and battery life behavior of a computing device by leveraging the data and information provided by sensors and other devices included in the computing device.

Figure 1:
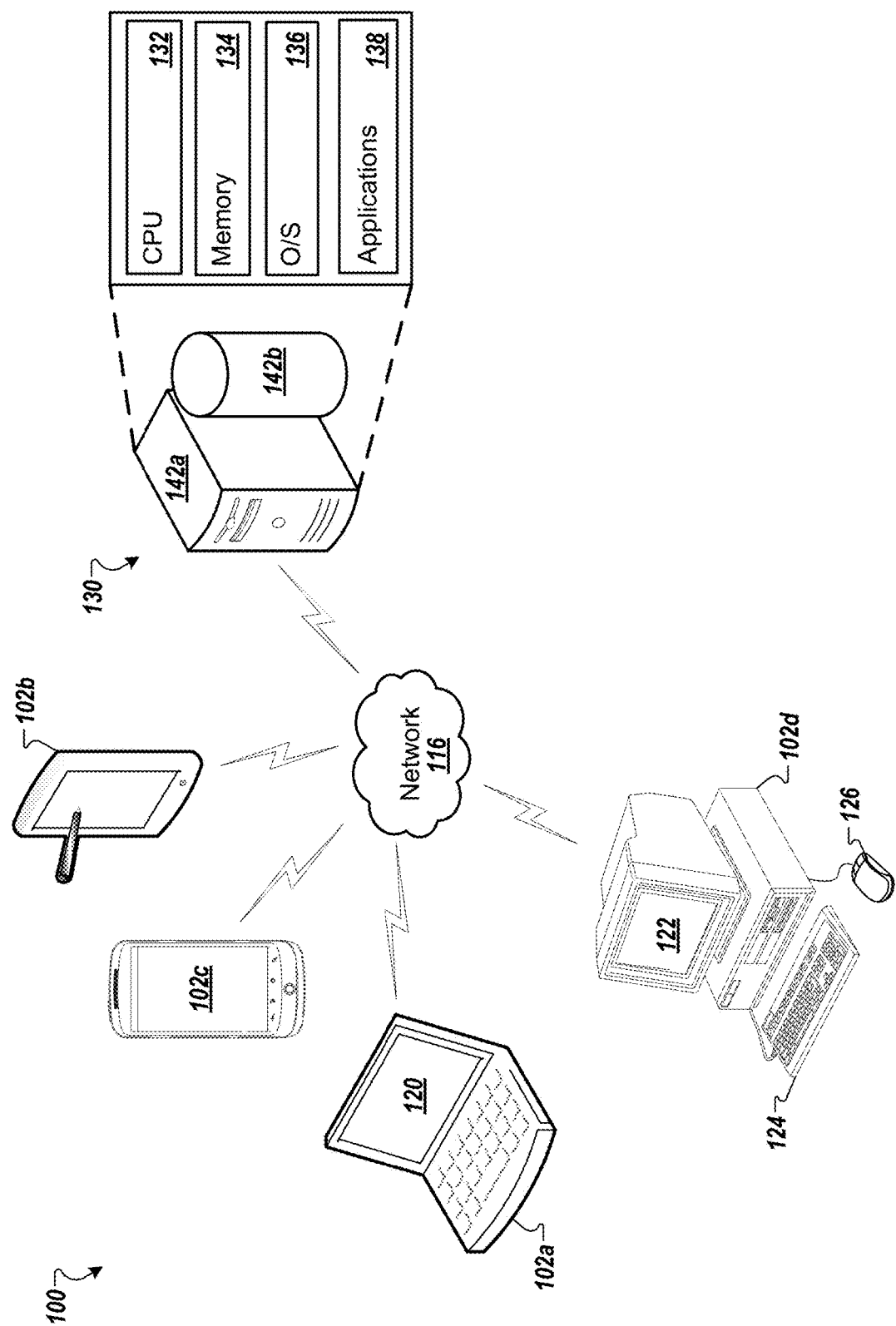
FIG. 1 is a diagram that illustrates an example system that includes example computing devices where each computing device includes sensors and other types of devices that can provide data and information about a context or operating state of a computing device.

FIG. 1 is a diagram that illustrates an example system 100 that includes example computing devices 102a-d. The computing devices 102a-d can each include sensors and other types of devices discussed herein that can provide data and information about a context or operating state of a computing device.

For example, computing device 102a can be a mobile phone, a smartphone, a personal digital assistant, or other type of mobile computing device. For example, computing device 102b can be a laptop or notebook computer. For example, computing device 102c can be a tablet computer. For example, the computing device 102d can be a desktop computer that includes a display device 122, a keyboard 124, and a mouse 126 or other type of pointing device. The computing devices 102a-d can communicate, using a network 116, with other computing devices or computer systems. In some implementations, the computing devices 102a-d can perform client-side operations, as discussed in further detail herein.

The system 100 includes a computer system 130 that can include one or more computing devices (e.g., server 142a) and one or more computer-readable storage devices (e.g., database 142b). The server 142a can include one or more processors (e.g., server CPU 132), and one or more memory devices (e.g., server memory 134). The computing devices 102a-d can communicate with the computer system 130 (and the computer system 130 can communicate with the computing devices 102a-d) using a network 116. The server 142a can execute a server O/S 136, and one or more server applications 138. In some implementations, the computer system 130 can represent multiple computing devices (e.g., servers) and multiple computer-readable storage devices (e.g., databases) working together to perform server-side operations. In some implementations, a single proprietor can provide one or more of the servers. The servers can include, but are not limited to, information servers, content servers, search servers, web crawler servers, marketplace servers, and mail servers. The applications 138 can include, but are not limited to, web searching applications, electronic mail applications, and applications that provide map services, weather reports, and news items and articles.

In some implementations, the network 116 can be a public communications network (e.g., the Internet, cellular data network, dialup modems over a telephone network) or a private communications network (e.g., private LAN, leased lines). In some implementations, the computing devices 102a-d can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Depending on a current operating state (operating mode) of a computing device (e.g., the computing devices 102a-d), the computing device may communicate with the computer system 130 using the network 116, requesting particular data and information relevant to the current operating state of the computing device. The computer system 130 can provide data and information to the computing device for use by the computing device. In some cases, the computing device may use the data and information when automatically waking up from a low power state and entering a predetermined operating mode based data and information provided by one or more sensors included in the computing device.

The computer system 130 can manage/maintain information and data for a user of one or more of the computing devices 102a-d. For example, the computer system 130 can be a mail server that can manage/maintain electronic mail (email) messages for a user. An email application executing on a computing device (e.g., the computing device 102a) can provide and display email messages on the display device 120 included in the computing device 102a. In some implementations, the computing device 102a can request the email messages from the computer system 130 by way of the network 116. The computing device 102a receive the email messages, store them locally on the computing device 102a (e.g., in memory included in the computing device 102a), and provide the email messages to the email application, which can then display the email messages to the user.

Figure 2:
FIG. 2 is a block diagram of example modules, components and devices that can be included in a computing device.

FIG. 2 is a block diagram of example modules, components and devices that can be included in a computing device 200. For example, the example modules, components and devices (also referred to herein as elements) can be included in the computing device 102a, the computing device 102b, the computing device 102c, and/or the computing device 102d as shown in FIG. 1.

The elements shown in FIG. 2 are for illustrative purposes and by way of example. In some implementations, a computing device may include fewer or additional modules, components and/or devices. In some implementations, a computing device may substitute certain elements with other elements. The various elements of the computing device 200 may be operationally coupled to one another. For example, one or more processor(s) 205 of the computing device 200 may be operationally coupled to one or more of the other elements of the computing device 200 using a single bus or multiple busses. The processor(s) 205 can control the operation of the computing device 200 by controlling/interacting with the modules, components and/or devices included in the computing device 200.

The computing device 200 can execute an operating system (O/S) 235. A real-time clock (RTC) 210 can provide time and date information (e.g., the time of day, the day of the week, etc.). The computing device 200 can use a timer 215 to set a particular time between event occurrences on the computing device 200. The computing device 200 can use the timer 215 to initiate an event at certain time after another detected event, condition, or operating state of the computing device 200.

The computing device 200 includes an audio system 220. The audio system 220 can include one or more audio output devices (e.g., speakers). The audio system 220 can include an audio input device (e.g., a microphone). For example, the audio system 220 can accept audio input as spoken words (e.g., voice commands) and process the spoken words as input commands for processing by the processor(s) 205. The processed audio input can allow for audio control of the computing device 200.

For example, a user can provide voice commands to the computing device 200. The voice commands can initiate an action on the computing device 200. For example, the user can use voice commands to activate a camera 292 included in the computing device 200. In another example, the voice commands can activate a calendar application included in the computing device 200.

The computing device 200 includes input device(s) 250. The input device(s) 250 can include, but are not limited to, a touchscreen display, a keyboard, a mouse, a trackpad, a touchpad, a pointing stick, one or more mouse buttons, a trackball, a joystick, and other types of input devices. The computing device 200 includes a display device 260. The display device 260 can include, but is not limited to, a liquid crystal display (LCD), a light emitting diode (LED) display, and a plasma display. In some implementations, the display device 260 can be a touchscreen. The computing device 200 includes output device(s) 240. The output device(s) 240 can include, but are not limited to, auxiliary lighting devices (e.g., LEDs), and haptic feedback devices (e.g., a vibration motor).

The computing device 200 includes memory 230. In some implementations, the memory 230 can be separate volatile (e.g., random-access memory (RAM)) and non-volatile memory (e.g., a hard disk drive and/or a flash memory drive) elements. In some implementations, sub-elements of the memory 230 can include volatile and non-volatile memory.

A communications module 233 can provide communications capability for the computing device 200. For example, the computing device 200 may be capable of communicating with a network (e.g., the network 116 in FIG. 1) using one or more wired and/or wireless communication interfaces/protocols, such as for example, 802.11 variations, WiFi, Bluetooth, Transmission Control Protocol/Internet Protocol (TCP/IP), Ethernet, and IEEE 802.3. In another example, the computing device 200 may be a mobile communications device (e.g., a mobile phone, a cell phone) capable of communicating over a cellular network.

The computing device 200 can execute the O/S 235 and one or more applications (e.g., a web browser application) that can display a user interface (UI) on the display device 260. In some implementations, a web browser application can include or be associated with one or more web applications. The web application can be executed/interpreted by the web browser application. The web application executed by the web browser application can include code written in a scripting language, such as, JavaScript, VBScript, ActionScript, or other scripting languages. For example, a web application can be an email application that can be executed/interpreted by the web browser application.

A natively operating application 285 can be an application that is coded using only web technology (defined here as code that can be implemented directly by a web browser application), such as JavaScript, ActionScript, HTML, or CSS. For example, the computing device 200 can download and install the natively operating application 285 from a marketplace server using a web browser application. The natively operating application 285 may operate using a runtime 255. The natively operating application 285 may be configured to be executed directly by the processor(s) 205 or by the O/S 235, using the runtime 255. Because the natively operating application 285 is coded using web technologies, no compilation step is required.

A native application 290 can include machine executable code and can be configured to be executed directly via the O/S 235. A web application 265 may be incapable of execution or display without the aid of a web browser. Thus, web applications can be run inside a browser with a dedicated user interface, and typically provide functionality and an experience that is more rich and interactive than a standalone website but are less cumbersome and monolithic than a native application. Examples of web applications can include, but are not limited to, games, photo editors, and video players that can run inside the web browser application. The web application 265 can provide a dedicated UI for display on the display device 260.

The processor(s) 205 can execute an application on the computing device 200. In some cases, an application can be integrated into the O/S 235. For example, the application can display a user interface (UI) on a display device 260 included in the computing device 200. The application can cause the computing device 200 to perform one or more actions on the computing device 200 that can include interactions with one or more of input device(s) 250, output device(s) 240, and the display device 260.

The computing device 200 can operate and/or implement a number of different power states. The power states can include, but are not limited to, one or more active power states, a suspend-to-RAM power state (e.g., a suspended power state), a suspend-to-disk power state (e.g., a hibernation power state) and a powered-off power state.

The one or more active power states can include a display-on active state and a display-off active state. In a display-on active state, the display device 260 of the computing device 200 is active (powered on) and can render visual content generated by one or more applications running on the computing device 200 (e.g., user application interfaces, video content being played by the computing device 200). In a display-off active state, the display device 260 is powered off. In the display-off active state, the other elements of the computing device 200 can operate in substantially the same manner as in the display-on active state. Because computing device displays, such as the display device 260, can consume a substantial amount of power when active, operating the computing device 200 in the display-off power state can consume significantly less power than operating the computing device 200 in the display-on active state. This can be important especially when a battery is providing power to the computing device 200.

The suspend-to-RAM power state of the computing device 200 can also be referred to as a standby mode, a sleep mode, or a suspend mode of operation of the computing device 200. In a suspend-to-RAM power state, the random access memory (RAM) receives sufficient power to retain information regarding an operating state of the computing device 200. The computing device 200 reduces or eliminates power to unneeded elements (components or parts) of the computing device 200. For example, a hard disk(s) stops spinning, the display device is placed into a display-off power state, and power is removed from peripheral or external devices. When the computing device 200 is in a sleep mode, many of the processing functions of the computing device 200 are powered down. In addition, the computing device 200 uses a small amount of power to preserve the contents of RAM, to maintain power to the sensors 270 in order for the sensors to remain active, and to support waking up the computing device 200 from the suspend-to-RAM power state into an active power state.

The suspend-to-disk power state of the computing device 200 can also be referred to as a hibernate mode, a safe sleep mode, or a suspend-to-disk mode. In a suspend-to-disk power state, the computing device 200 can write the contents of the RAM included in the computing device 200 to non-volatile memory (non-volatile storage) (e.g., a hard disk, a file on a FLASH drive, a separate memory partition) before entering the suspend-to-disk power state. When the computing device 200 is restarted, the computing device 200 reloads the data that was previously written to the non-volatile memory, restoring the computing device 200 to the state that it was in when the suspend-to-disk power state was entered. To enable use of a suspend-to-disk power state, the hard disk (or other non-volatile memory) must have sufficient free space to store all non-replaceable contents of RAM. When the computing device 200 is in the hibernation mode, the computing device 200 can consume a minimal amount of power, less power than when the computing device 200 is in a sleep mode. In addition, however, the computing device 200 maintains power to the sensors 270 in order for the sensors to remain active, and to support waking up the computing device 200 from the suspend-to-disk power state into an active power state.

The hibernate mode and the sleep mode can be collectively referred to as low power modes. During the hibernate mode and the sleep mode, the computing device 200 can decide/determine, based on data (information, events) detected by the sensors 270 and/or based on information (data) provided by the input device(s) 250, the real-time clock 210, the timer 215 and the audio system 220, to change a power state of the computing device 200 (e.g., wake up the computing device 200) in accordance with the techniques described herein. In addition, or in the alternative, during the suspend-to-RAM power state and/or the suspend-to-disk power state, the computing device 200 can perform one or more actions and/or run one or more applications in preparation for changing the power state of the computing device 200 in accordance with the techniques described herein. For example, the computing device 200 may need to enter a power state that provides power to or increases the power to the processor(s) 205, the operating system 235, and the communications module 233 in accordance with the techniques described herein.

A power manager 225 can manage the process of transitioning the computing device 200 between power states (from one power state to another). For example, the power manager 225 can include a power manager controller 227. The power manager controller 227 can control (interact with, signal) one or more elements of the computing device 200 in order to initiate or cause a desired change in the power state of the computing device 200. The change in power state can be based on one or more signals (information or data) provided by (received from) the other elements of the computing device 200 (e.g., sensors 270, the input device(s) 250, the real-time clock 210, the timer 215, the audio system 220).

The power manager 225 can monitor the elements of the computing device 200 to ensure the completion of any operations or functions that are associated with the transition between power states of the computing device 200. For example, if the computing device 200 is transitioning from an active power state to a sleep mode, a hibernation mode, or an off state, the power manager 225 may monitor the various elements of the computing device 200 to ensure that any housekeeping operations are completed before allowing the computing device 200 to initiate the transition. For example, the power manager 225 can ensure that operating state information is saved for use when the computing device 200 is returned to an active power state.

The sensors 270 can detect the occurrence of certain events, such as changes in a physical orientation of the computing device 200 and/or changes in an ambient environment of the computing device 200. In response to detecting the certain events, the sensors 270 can the provide data/information to the power manager controller 227 (and/or the processor(s) 205) about the detected events. In the computing device 200, the power manager 225 (e.g., using the power manager controller 227) can select a power state for the computing device 200 and can initiate a transition of the computing device 200 to the selected power state. For example, while transitioning the computing device 200 from a hibernate mode or a sleep mode, to an active power state, the computing device 200 can automatically execute one or more applications, preparing/readying the computing device 200 for use by the user once the computing device 200 is in the active power state.

The sensors 270 can detect the occurrence of various events and can provide data/information regarding the events to the power manager 225. As shown in the example in FIG. 2, the sensors 270 can include a gyrometer (gyroscope) 271, accelerometer(s) 272, a light sensor 273, a temperature sensor 274, a location sensor(s) 275, biosensor(s) 276, environment sensor(s) 277, motion sensor(s) 278, proximity sensor(s) 279, and touch sensor(s) 281. In some implementations, other types of sensors may be included in the sensors 270, while in other implementations, one or more of the sensors 270 shown in FIG. 2 may be eliminated.

The gyrometer 271 can detect changes in a physical orientation of the computing device 200 (e.g., between a vertical orientation and a horizontal orientation). The gyrometer 271 can determine the roll, pitch and yaw of the computing device 200. The accelerometer(s) 272 can detect changes in vibrations, or patterns of vibrations occurring in an ambient environment of the computing device 200. Footsteps of a person or persons walking near the computing device 200 or movement of the computing device 200 may cause the vibrations. In addition or in the alternative, the accelerometer(s) 272 can measure a force of acceleration caused by movement of the computing device 200 or by gravity. For example, the accelerometer(s) 272 may detect the computing device 200 is falling to the ground or otherwise being dropped. The detection of the computing device 200 being dropped can be stores on the computing device 200 (e.g., in the memory 230) as a user statistic.

The light sensor 273 can detect changes in a measured light intensity in the ambient environment of the computing device 200. Lights being turned on or off, or removing the computing device 200 from or placing the computing device 200 into a carrying case can cause changes in a measured light intensity. The temperature sensor 274 can detect changes in a measured temperature in the ambient environment of the computing device 200. Turning a climate control system on or off, or removing the computing device 200 from a carrying case can cause a change in a measured temperature.

The location sensor(s) 275 can detect changes in a physical location of the computing device 200, such as may occur if a user is traveling with the computing device 200. In some implementations, the location sensor(s) 275 can include a global positioning system (GPS). In some implementations, the location sensor(s) 275 can interface with the communications module 233 and can operate based on WiFi or cellular communication signals (e.g., using triangulation or other approaches). The computing device 200 can use this approach for determining location in addition to, or in place of a GPS.

The biosensor(s) 276 can include, but are not limited to, fingerprint sensors, heart rate sensors, glucose sensors, and odor detectors or sensors. The environment sensor(s) 277 can include, but are not limited to, an altimeter, a barometer, a relative humidity sensor, and a step sensor. For example, the altimeter can detect an altitude associated with the computing device 200. Based on the detected altitude, the computing device 200, when waking up from a hibernate mode or a sleep mode to an active power state, may be placed in an airplane mode of operation, disabling cellular communication functions. In another example, the step detector may detect movement of a user of the computing device 200 (e.g., the user is walking with the computing device 200). The computing device 200, when waking up from a hibernate mode or a sleep mode to an active power state, can also activate an email application in preparation for the user to view email when they finish walking to a particular destination.

The proximity sensor(s) 279 can include one or more sensors capable of determining a proximity of a user to the computing device 200 without the user needing to physically contact the computing device 200. Example proximity sensors can include, but are not limited to, capacitive sensors, inductive sensors, ultrasonic sensors, and infrared sensors. For example, a capacitive sensor can detect the proximity of a body part of the user or other conductive object to the computing device 200. Based on the detected proximity, the computing device 200 can wake up from a hibernate mode or a sleep mode to an active power state and can display on the display device 260 information the user may be interested in seeing, such as the current time, the local weather report, and a breaking news headline.

The touch sensor(s) 281 can include one or more sensors capable of detecting a physical contact (e.g., touching, holding, squeezing) of a user with the computing device 200. For example, touching/contacting the computing device 200 in a particular location or squeezing the computing device 200 can wakeup the computing device 200 from a hibernate mode or a sleep mode to an active power state and can activate a flashlight application on the computing device 200. In addition, touching/contacting the computing device 200 in the particular location or squeezing the computing device 200 again can de-activate the flashlight application and place the computing device 200 back into a hibernate mode or a sleep mode.

Each of the sensors 270 can selectively provide data/information about detected events to the power manager 225 when the computing device 200 is in a low power state, an active power state, and/or when the computing device 200 is transitioning between power states. The determination of the sub-set of the sensors 270 that provide information can be based on power consumption. For example, all of the sensors 270 can be active when the computing device 200 is in an active power state. A first sub-set of the sensors 270 (less than all of the sensors 270) may be active when the computing device 200 is in a sleep mode. A second sub-set of the sensors 270 (that is smaller than the first sub-set of the sensors 270) may be active when the computing device 200 is in a hibernate mode. In some implementations, the gyrometer 271, the accelerometer(s) 272, the light sensor 273, the temperature sensor 274, the biosensor(s) 276, the environment sensor(s) 277, the motion sensor(s) 278, the proximity sensors(s) and the touch sensor(s) 281 may provide data/information to the power manager 225 regardless of the power state of the computing device 200. The location sensor(s) 275, however, may provide location information to the power manager 225 when the computing device 200 is in an active power state. In some implementations, a location of the computing device 200 may be determined by the location sensor(s) 275 in response to the power manager controller 227 being activated (e.g., by an event detected by one of the other sensors 270). Information regarding events detected by the sensors 270 that is provided to the power manager 225 may be used by the power manager 225 to generate a heuristic-based usage pattern for the computing device 200. The power manager 225 can provide the usage pattern to a prediction module 295.

The computing device 200 can use the prediction module 295 to improve power management for the computing device 200. The computing device 200 wakeup and battery life behavior can be enhanced by leveraging the data/information provided by the sensors 270, as well as the real-time clock 210, the timer 215, the audio system 220, and an activity monitor 245 as well as past user-based behavior when interacting with the computing device 200 to enhance a user's experience when using the computing device 200, such as by using the techniques described herein. Based on information provided by the sensors 270, the power manager 225 may automatically wakeup the computing device 200 from a hibernate mode or sleep mode and automatically initiate or launch an application on the computing device 200 based on past usage of the computing device 200 by the user. This can reduce, or eliminate the amount of time a user has to wait before being able to begin using a computing device. In comparison, a user would first interact with the computing device (e.g., using an input device) to initiate a power state transition and then interact again with the computing device to launch one or more applications.

In some implementations, the computing device 200 may use the data/information regarding events detected by the sensors 270 alone, or in combination with each other and/or along with data/information provided by the real-time clock 210, the timer 215, the audio system 220, and the usage pattern information included the activity monitor 245. In some implementations, the activity monitor 245 can monitor usage patterns of the computing device 200 (e.g., times when the computing device 200 is typically used and how the computing device 200 is typically used). The activity monitor can keep track (keep a record) of such patterns.

The activity monitor 245 includes user provided information 247. For example, the user provided information 247 can include out-of-office notices and calendar information (e.g., scheduled events, meetings, appointments, vacations, or otherwise). The activity monitor 245 can include usage pattern data/information for the computing device 200. A prediction module 295 can use the usage pattern data/information when determining one or more actions or activities to perform on the computing device 200 based on data/information received from the sensors 270 when transitioning between power states.

An algorithm executed by a computing device 200 can "learn" (e.g., learn while in a learning mode, learn in response to multiple repeated interactions over a period of time) to associate certain sensor information, data and/or events received while the computing device 200 is in a particular state with actions performed by the computing device. A user of the computing device 200 may be provided with an opportunity to control whether programs or features included in the computing device 200 may collect this information.

For example, the algorithm can learn that when a computing device is placed in a stationary position after a certain time of day (11:00 pm), the computing device should be placed in a hibernate mode and in a quiet operating mode (e.g., no audio feedback, no audio warnings, the device is silenced).

In another example, the algorithm can learn that when a computing device is placed in a stationary position at another time of day (e.g., 6:00 pm), the user will more than likely not interact with the computer device for approximately one hour. The approximate one hour timeframe can be considered downtime for the computing device. The computing device, during the downtime, can re-synchronize (re-sync) the data included on the computing device with data include on a server remote from the computing device. For example, the computing device (e.g., computing device 102a-d) can connect to the server 142a using the network 116 in order to re-sync the data included on the computing device (e.g., download email messages).

The sensors 270 and input device(s) 250 can provide gesture information to the computing device 200. A user may wave a hand over the computing device 200 and the proximity sensor(s) can detect this particular gesture. The user may make contact with/touch the computing device 200. A touchscreen and/or the touch sensor(s) 281 included in the computing device 200 can detect the particular type of touch (a stationary fixed touch with a certain applied pressure at a certain point or area of the computing device 200, a holding and squeezing of the computing device 200, a finger swipe across a touch-sensitive surface (e.g., a touchscreen, a touchpad, a trackpad) of the computing device 200) and based on the detected type of touch can initiate a particular action on the computing device.

For example, the computing device 200 can recognize particular detected gestures as child-specific gestures. When the child-specific gestures are detected, the computing device 200 can enter a child-specific mode of operation.

The detected gestures when a user is interacting with the sensor(s) 270 and input device(s) 250 can be used by the computing device 200 to determine how a user may be interacting with the computing device 200. An operating mode of the computing device 200 can be customized based on the detected gestures. For example, appropriate tracking applications and recommendation applications can be run. In addition or in the alternative, a dashboard displaying information to the user can be customized based on the detected gestures. The detected gestures can also be used as input to an application (e.g., a game application).

In some implementations, an application running on the computing device 200 can activate and use information provided by the sensor(s) 270 and the input device(s) 250 to customize the use of the application. For example, an audio application can receive location information from the location sensor(s) 275 and ambient noise from a microphone included in the audio system 220. Based on this information, the audio application can adjust preferences for the application across the computing devices 120a-d. In another example, an application can receive proximity data/information from the proximity sensor(s). The application can use the proximity data to determine the proximity of one or more users to the computing device 200. The application can use the proximity data to adjust a functionality of the application.

In some implementations, two or more of the elements included in the computing device 200 may be combined into a single element. For example, the power manager 225, or portions of the power manager 225, can be included as part of the O/S 235. In some implementations, the power manager 225, the power manager controller 227, and the activity monitor 245 can be implemented in firmware included in the computing device 200. In some implementations, the functions of the power manager 225, as describe herein, may be implemented in other fashions by one or more other elements of the computing device 200.

FIG. 3A is a diagram that shows an illustration of a user 302 placing the computing device 200 on a table 304. FIG. 3B is a diagram that shows an illustration of the display device 260 included in the computing device 200. FIG. 3C is a diagram that shows an illustration of the user 302 moving/walking towards the table 304 and content 308 displayed on the display device 260 of the computing device 200.

Figure 4:
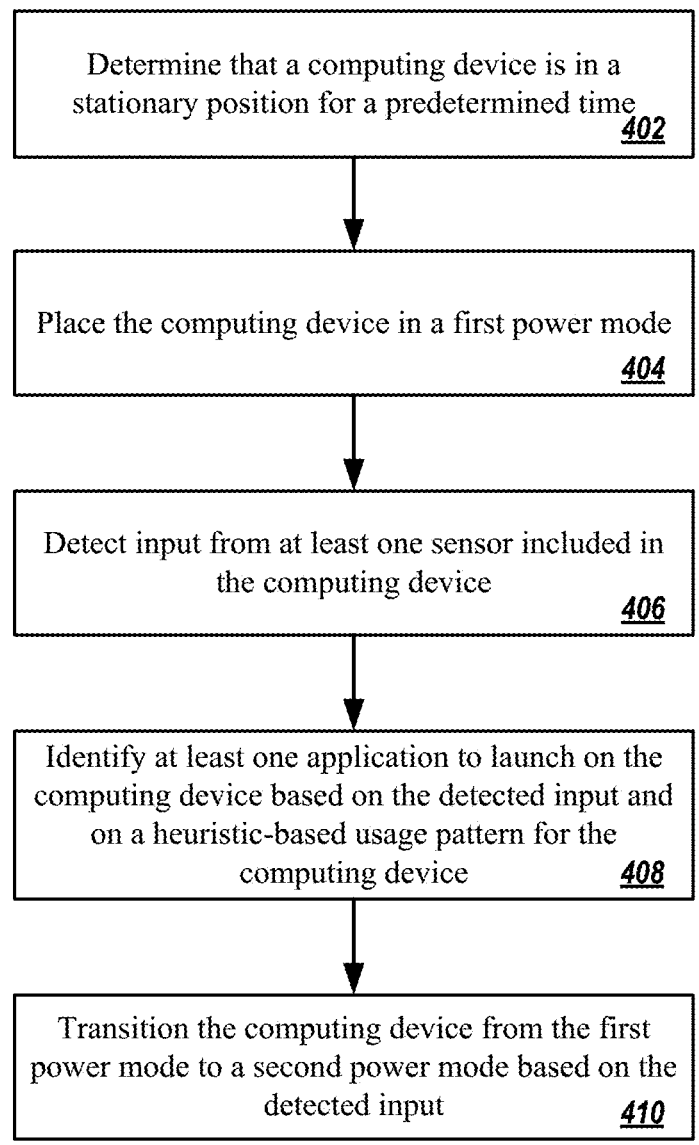
FIG. 4 is a flowchart that illustrates a method for waking up a computing device.

FIG. 4 is a flowchart that illustrates a method 400 for waking up a computing device. In some implementations, the systems described herein can implement the method 400. For example, the method 400 can be described referring to FIGS. 1, 2, and 3A-C.

The method 400 determines that a computing device has remained stationary for a predetermined time (block 402). Referring to FIGS. 2 and 3A, the user 302 places the computing device 200 on the table 304. The user 302 walks away, leaving the computing device 200 on the table 304. FIG. 3B shows that the display device 260 of the computing device 200 is in a display-off active state (the display device 260 is not displaying any content). For example, the computing device 200, using information and data provided by the accelerometer(s) 272, the input device(s) 250, the motion sensor(s) 278, the proximity sensor(s), the touch sensor(s) 281 and the real-time clock 210 determines that the computing device 200 has remained in a stationary position for a predetermined period of time (e.g., 15 minutes). The computing device 200 makes this determination based on not receiving any input, data, and/or information from the accelerometer(s) 272, the input device(s) 250, the motion sensor(s) 278, the proximity sensor(s), and the touch sensor(s) 281.

Based on determining that the computing device has remained stationary for a predetermined period of time, the computing device is placed in a first power mode (e.g., a sleep mode, a hibernate mode, or a mode where the display device 260 is in a display-off active state) (block 404).

Input from one or more sensors is detected (block 406). For example, the accelerometer(s) 272 can detect vibrations (or a change in vibrations or vibration patterns) occurring in an ambient environment of the computing device 200. The detected vibrations can be indicative of footsteps in the vicinity of the computing device 200, such as those of the user 302 approaching the computing device 200 as shown in FIG. 3C. In another example, the proximity sensor(s) 279 can detect a proximity of the user 302 to the computing device 200. The computing device 200 using information and data provided by the accelerometer(s) 272 and the proximity sensor(s) 279 can trigger a wakeup operation.

As part of the wakeup operation, the detected input/information can be provided to a power manager. For example, the accelerometer(s) 272 and the proximity sensor(s) 279 can provide information and data to the power manager 225. As part of selecting the next power state for the computing device 200, the power manager 225 may obtain information from the activity monitor 245 and/or the RTC 210. The power manager 225 can use the detected vibrations sensed by the accelerometer(s) 272 and the proximity information and data indicative of the proximity of the user 302 sensed by the proximity sensor(s) 279 in combination with a current day and time of day (e.g., Monday morning at 7:00 am) and user provided information 247 included in the activity monitor 245 to determine the next power state for the computing device 200. For example, the power manager 225 can determine that since it is Monday morning at 7:00 am and the user 302 is approaching/moving towards the computing device 200 that the user 302 would like to view content (e.g., the content 308) on the display device 260 of the computing device 200. This determination can further be based on past interactions of the user 302 with the computing device 200 that can be included in the user provided information 247 in the activity monitor 245.

At least one application to launch on the computing device is identified based on the detected input and on a heuristic-based usage pattern for the computing device (block 408). The computing device is transitioned to a second power state (e.g., an active power state) based on the detected input/information (block 410). For example, if information included in the activity monitor 245 (e.g., usage patterns and/or the user provided information 247) and/or information from the RTC 210 (e.g., day of week and/or time of day) indicates that it is likely that the user 302 may want to use the computing device 200, the power manager 225 may initiate a transition of the computing device from a hibernation mode or a sleep mode to an active power state. For example, the power manager 225 can determine that since it is Monday morning at 7:00 am and the user 302 is approaching/moving towards the computing device 200 that the user 302 would like to view content (e.g., the content 308) on the display device 260 of the computing device 200. The computing device 200 can then be woken up and placed in the active power state.

The computing device automatically initiates/launches one or more applications on the computing device based on the transition from the first power state to the second power state. The one or more applications provide content for display on a display device included in the computing device. For example, the computing device 200 can provide the content 308 for display on the display device 260. The content 308 can include information that the user 302 is interested in seeing (having display on the display device 260) when the computing device 200 is transitioned from a low power state to an active power state. The selection/determination of items 310a-e for inclusion in the content 308 can be based on the usage pattern data/information for the computing device 200 included in the activity monitor 245.

In the non-limiting example shown in FIG. 3C, the content 308 includes a current date and time item 310a. The RTC 210 can provide the date and time information. The content 308 includes a current weather conditions item 310b for a city identified as the current location of the computing device 200. The location sensor(s) 275 can provide location information to a weather application launched by the computing device 200. The weather application can determine the current weather conditions for the provided location for display on the display device 260. The content 308 can include appointment/meeting information item 310c. The computing device 200 can launch a calendar application. The RTC 210 can provide the current date to the calendar application. The calendar application can determine appointments and meetings included in an electronic calendar for the provided date. The computing device 200 can display the appointment/meeting information item 310c in the content 308. The content 308 can include a latest local sports news item 310d and a latest national news item 310e. The computing device 200 can launch a sports news application and/or a national news application. The location sensor(s) 275 can provide location information to the news applications launched by the computing device 200. The news applications can determine the latest local sports news item 310*d* and the latest national news item 310*e* for inclusion in the content 308 for display on the display device 260.

Alternatively, the user may touch the computing device 200 (e.g., pick up the computing device 200, hold the computing device 200, squeeze the computing device 200). In these cases, the touch sensor(s) 281 can detect the contact of the user with the computing device 200. In addition or in the alternative, the user can interact with the biosensor(s) 276 when contacting the computing device 200. The computing device 200 can automatically wake up (exit a low power state and enter an active power state) and automatically initiate/launch one or more applications on the computing device 200. The computing device 200 can therefore be immediately ready for use by the user. In addition, or in the alternative, the display device 260 included in the computing device 200 can display information to the user provided by the launched one or more applications.

For example, the computing device 200 can automatically wake up, and launch an email application, a news service application, and a horoscope application. As described with reference to FIG. 2, the applications can be native applications 290, natively operating applications 285, or web applications 265.

In some implementations, the power manager 225 can be configured to operate in conjunction with the timer 215 (as well as using other information) when selecting power states for the computing device 200. The sensors 270 can detect one or more events and provide information regarding the detected events to the power manager 225. For example, the light sensor 273 can detect a change in light intensity in an ambient environment of the computing device 200 (e.g., such as office lights being turned on. The light sensor 273 can provide the data/information representative of the change to the power manager 225. The power manager 225 can determine, based on usage pattern data/information included in the activity monitor 245 and day and time information from the RTC 210, that a user typically uses the computing device 200 approximately thirty minutes after such an event occurs on a particular day of the week and at a particular time during the day.

As a result of this determination, the power manager 225 can set the timer 215 to initiate a transition of the computing device 200 from a low power state to an active power state twenty-five minutes after the detection of the change in light intensity. In addition, the power manager 225 can launch/initiate one or more applications on the computing device 200. For example, the power manager 225 can determine, based on usage pattern data/information included in the activity monitor 245, that once the computing device 200 wakes up, the user checks email and the latest stock prices. The computing device 200 can launch an email application where the computing device 200, using the communications module 233, can connect to an email server and download any email messages for the user to the computing device 200. In addition, the computing device 200 can launch a stock market monitoring application. Such an approach allows the user to begin using the computer after the power state transition is complete, without having to first interact with the computing device 200 to initiate the power state transition and then interact with the computing device 200 again to launch the applications.

In a first example, the computing device 200 can be a laptop computer (e.g., the computing device 102*a* in FIG. 1). A user, before going to bed, closes the laptop computer that is on a desk (e.g., a lid of the laptop computer is rotated/moved to make contact with a base of the laptop computer).

The accelerometer(s) 272 included in the laptop computer can determine that the laptop computer is in a closed position. Based on determining that the laptop is in a closed position, the laptop can enter a low power mode (e.g., a sleep mode). In addition, the laptop computer can determine, based on the lack of any additional data/information from the accelerometer(s) 272 as well as the input device(s) 250, the motion sensor(s) 278, the proximity sensor(s), and the touch sensor(s) 281 for a period of time (e.g., one hour as determined by a time of day clock included in the laptop computer), that the laptop computer has remained stationary (not moved). Based on this contextual information, the laptop computer can enter an even lower power mode (e.g., a hibernation mode).

In a second example, at a particular time in the morning (e.g., 6:00 am as determined by a time of day clock included in the laptop computer) while the laptop computer is still in a hibernation mode, and before the user otherwise touches, moves, or interacts with the laptop computer, the laptop computer can partially wake-up (e.g., enter a display-off active state) where the laptop computer, for example, connects to an available network and downloads email and other electronic information for the user onto the laptop computer. The particular time in the morning when the laptop computer partially wakes up can be determined based on a record of prior interactions of the user with the laptop computer that can be included in the usage pattern data/information for the computing device 200 included in the activity monitor 245. For example, when the user wakes up they check their email at approximately 6:30 am most mornings. In this example, when the user opens the laptop computer to check email at approximately 6:30 am, the email files and messages are already downloaded to the laptop computer and ready for viewing, enhancing the user's experience with the laptop computer.

In a third example, a user takes the laptop computer off the desk in the closed position, places the laptop computer in a carrying case, and leaves for the office. When the user arrives at work, they first check their email before starting the workday. In this case, a light sensor on the laptop computer can detect a lack of light (an indication of the laptop computer being placed in the carrying case) and the accelerometer(s) 272 and/or the motion sensor(s) 278 can detect the movement of the laptop computer and/or the orientation of the laptop computer (e.g., placed vertically within the carrying case). Based on the sensor data, the laptop computer can partially wake-up (e.g., enter a display-off active state) where the laptop computer, for example, connects to an available network and downloads email and other electronic information for the user onto the laptop computer. In this example, when the user opens the laptop computer when they arrive at the office to check email and begin the workday, the email files and messages are already downloaded to the laptop computer and ready for viewing, enhancing the user's experience with the laptop computer.

In a fourth example, the user closes the laptop computer, picks up the laptop computer in the closed position, and walks to a conference room for a meeting. The accelerometer(s) 272 included in the computing device 200 can determine that the laptop computer is in a closed position. Based on determining that the computing device 200 is in a closed position, the computing device 200 can enter a low power mode (e.g., a sleep mode). In addition, the accelerometer(s) 272 and/or the motion sensor(s) 278 can detect the movement of the computing device 200. In some cases, the location sensor(s) 275 can detect a change in location of the computing device 200. As the user is walking, computing device 200 can launch a calendar application and determine that the user has a meeting. Based on this information, the computing device 200 can launch/initiate additional applications on the computing device 200 that the user may interact with in order to participate in and/or conduct the meeting (e.g., a presentation application, a note-taking application, a video conferencing application, etc.). When the user arrives to the conference room, the user can open the laptop computer. The laptop computer can enter an active power state with the application(s) running and ready for use by the user.

In a fifth example, the computing device 200 can be a desktop computing device (e.g., the computing device 102d in FIG. 1). A user leaves an office in the evening, leaving the computing device 200 in the office. One or more sensors on the computing device 200 can determine that the user has left the office. For example, the light sensor 273 detects low or no light (the user has turned the office light off) and the RTC 210 determines that the detected low light condition is for a certain period of time. In addition or in the alternative, the proximity sensor(s) 279 does not detect proximity of a user. Based on determining that the user has left the office, the computing device 200 enters a low power mode (e.g., a sleep mode, a hibernate mode).

When the user returns to the office the next day, the proximity sensor(s) 279 senses the proximity of the user to the computing device 200 (e.g., the user sits down at a desk where the computing device 200 is located). In addition or in the alternative, the accelerometer(s) 272 can detect vibrations (or a change in vibrations or vibration patterns) occurring in an ambient environment of the computing device 200. The detected vibrations can be indicative of footsteps in the vicinity of the computing device 200, such as those of a user approaching the computing device 200. In addition or in the alternative, the light sensor 273 detects increased ambient light (the user has turned the office light on.) The computing device 200, based on detecting some or all of the contextual information, wakes up (enters an active power state) and begins to perform operations in preparation for anticipated user interactions with the computing device 200. For example, the computing device 200 connects to an available network and synchronizes data and applications with the network in preparation for the user interacting with the data and applications.

In a sixth example, the computing device 200 can be a mobile computing device (e.g., the computing device 102c in FIG. 1). A user places the mobile computing device on a flat surface (e.g., on a desk, on a table, an end table) before going to bed. The accelerometer(s) 272 included in the computing device 200 can determine that the computing device 200 is in a flat, stationary position. In addition, the computing device 200 can use the RTC 210 to determine the time of day (e.g., 11:00 pm). In addition or in the alternative, the computing device 200 can determine, based on the lack of any additional data/information from the input device(s) 250, the motion sensor(s) 278, the proximity sensor(s), and the touch sensor(s) 281 that the computing device 200 is n a stationary position.

Based on a record of prior interactions of a user with the computing device 200 (information included in the activity monitor 245 (e.g., usage patterns and/or the user provided information 247)), the computing device 200 can automatically enter a predetermined operating state. For example, the computing device 200 can enter a low power state (e.g., a sleep mode, a hibernate mode) and be placed into a quiet mode (e.g., audible indicators are silenced). The predetermined operating state can be an operating state that the user may have selectively entered when the computing device 200 was in the particular context and/or operating state.

The user wakes up in the morning and approaches the computing device 200. The proximity sensor(s) 279 can detect the proximity of the user. Alternatively, the user may otherwise touch the computing device 200 (e.g., pick up the computing device 200, hold the computing device 200, squeeze the computing device 200). The touch sensor(s) 281 can detect the contact of the user with the computing device 200. The computing device 200 can automatically wake up (exit the low power state and enter a full power state) and be ready for use by the user. In addition, or in the alternative, the display device 260 included in the computing device 200 can display information to the user.

In a seventh example, the computing device 200 can be a mobile computing device (e.g., the computing device 102c in FIG. 1). The motion sensor(s) 278 can detect a user walking/running and based on the detection, the computing device 200, if in a low power state, can wake up and launch/initiate an application on the computing device 200 that can track a progress of a user as the walk/run. In addition or in the alternative, the computing device 200 can interface with one or more biosensor(s) 276 that can provide a heart rate indication for the user as they walk/run.

In an eighth example, a user can provide voice commands to a computing device (e.g., the computing device 200). A speaker included in the audio system 220 can receive the voice commands/input and can initiate an action on the computing device 200 based on the interpreted voice commands. For example, the user can use voice commands to activate a camera included in the computing device 200. In another example, voice commands/input can be used to enter information into an application running on the computing device 200 (e.g., a new appointment added to a calendar application, a new task added to a task management application).

Figure 5:
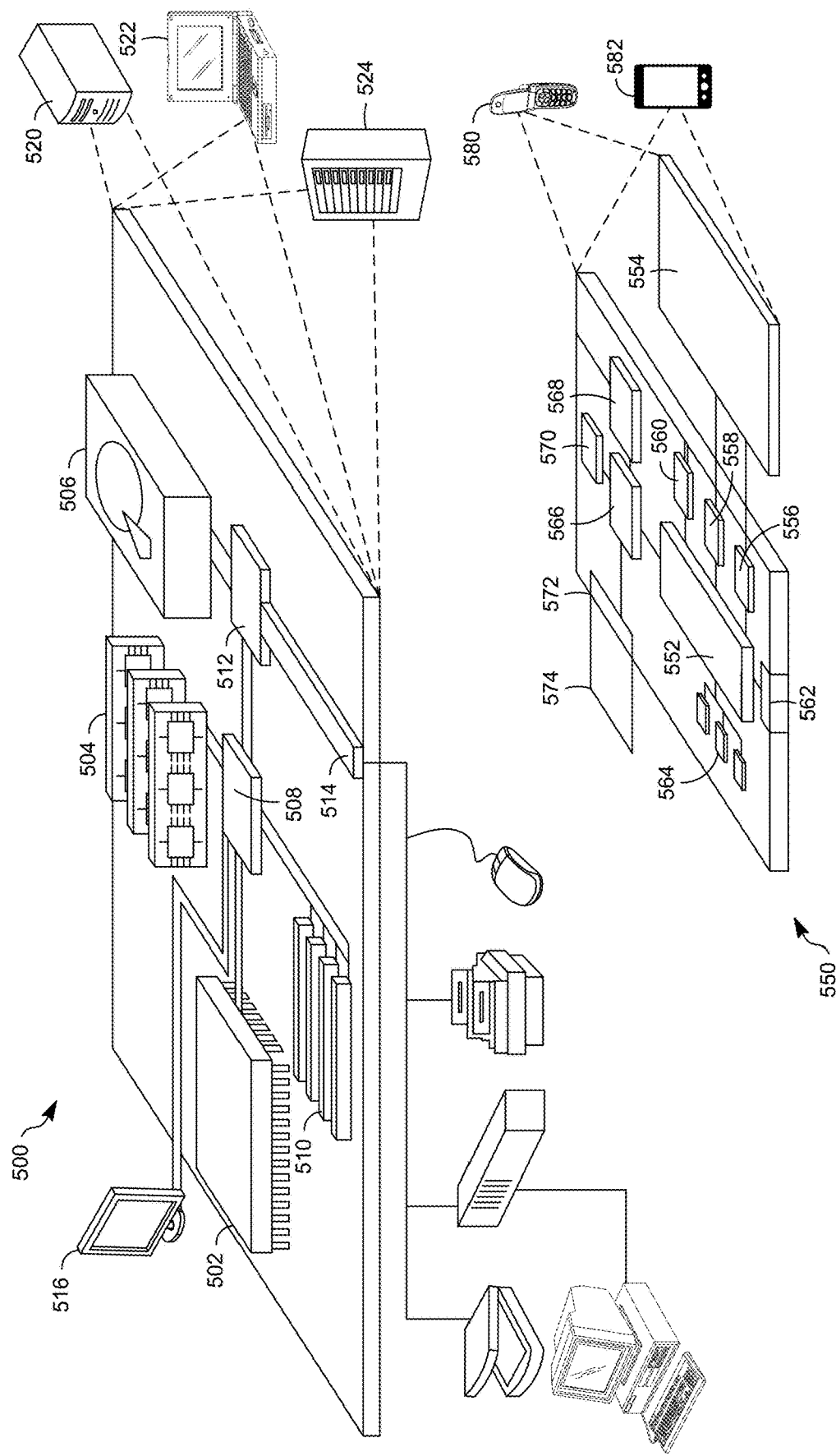
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   determining that a computing device satisfies criteria, the criteria including:
      the computing device being placed in a stationary position,
      a usage pattern associated with the computing device, and
      a prediction of no user interaction based on the usage pattern and a time of day;
   operating the computing device in a downtime mode based on the computing device satisfying the criteria, and synchronizing data included in the computing device with data included on a remote server during the downtime mode;
   transitioning the computing device to an active power state; and
   launching an application on the computing device based on the synchronized data after the transitioning.

2. The method of claim 1, wherein the synchronizing of the data includes downloading email messages.

3. The method of claim 1, wherein the usage pattern includes a user not interacting with the computing device during the time of day.

4. The method of claim 1, wherein the usage pattern includes a lack of input into one or more sensors included in the computing device.

5. The method of claim 1, wherein the criteria further include no input to the computing device being detected for a predetermined time.

6. The method of claim 1, wherein:
the active power state comprises a next active power state; and
the method further comprises determining that the computing device is operating in an active power state, before determining that the computing device satisfies the criteria, based on determining that input to the computing device has been detected during a predetermined time.

7. The method of claim 1, wherein synchronizing data included in the computing device with data included on the remote server is in preparation for user-interactions with the data included in the computing device.

8. A non-transitory, machine-readable medium having instructions stored thereon, the instructions, when executed by a processor, being configured to cause a computing device to:
determine that the computing device satisfies criteria, the criteria including:
the computing device being placed in a stationary position,
a usage pattern associated with the computing device, and
a prediction of no user interaction based on the usage pattern and a time of day;
operate the computing device in a downtime mode based on the computing device satisfying the criteria, and synchronize data included in the computing device with data included on a remote server during the downtime mode;
transition the computing device to an active power state; and
launch an application on the computing device based on the synchronized data after the transitioning.

9. The medium of claim 8, wherein the synchronizing of the data includes downloading email messages.

10. The medium of claim 8, wherein the usage pattern includes a user not interacting with the computing device during the time of day.

11. The medium of claim 8, wherein the usage pattern includes a lack of input into one or more sensors included in the computing device.

12. The medium of claim 8, wherein the criteria further include no input to the computing device being detected for a predetermined time.

13. The medium of claim 8, wherein:
the active power state comprises a next active power state; and
the instructions are further configured to cause the computing device to determine that the computing device is operating in an active power state based on the computing device determining that input to the computing device has been detected during a predetermined time.

14. The medium of claim 8, wherein synchronizing data included in the computing device with data included on the remote server is in preparation for user-interactions with the data included in the computing device.

15. A computing device comprising:
a power manager configured to:
determine that the computing device satisfies criteria, the criteria including:
the computing device being placed in a stationary position,
a usage pattern associated with the computing device, and
a prediction of no user interaction based on the usage pattern and a time of day; and
transition the computing device to an active power state; and
a communications module configured to facilitate communications between the computing device and a remote server, the communications synchronizing data included in the computing device with data included on the remote server while the computing device is operating in a downtime mode based on the computing device satisfying the criteria, the synchronizing of the data including receiving the synchronized data from the remote server,
wherein the power manager is further configured to launch an application based on the received synchronized data after transitioning the computing device to the active power state.

16. The computing device of claim 15, wherein the usage pattern includes a user not interacting with the computing device during the time of day.

17. The computing device of claim 15, wherein the usage pattern includes a lack of input into one or more sensors included in the computing device.

18. The computing device of claim 15, wherein the criteria further include no input to the computing device being detected for a predetermined time.

19. The computing device of claim 15, wherein:
the active power state comprises a next active power state; and
the power manager is further configured to determine that the computing device is operating in an active power state based on determining that input to the computing device has been detected during a predetermined time.

20. The computing device of claim 15, wherein synchronizing data included in the computing device with data included on the remote server is in preparation for user-interactions with the data included in the computing device.

* * * * *